(12) United States Patent
Schulte

(10) Patent No.: US 7,083,001 B1
(45) Date of Patent: Aug. 1, 2006

(54) MULTIPURPOSE, HAND HELD, WEED EXTRACTING, GARDEN TOOL

(75) Inventor: Stephen J. Schulte, Marshfield, WI (US)

(73) Assignee: Kale Stephen Schulte, Holualoa, HI (US)

( * ) Notice: Subject to any disclaimer, the term of this patent is extended or adjusted under 35 U.S.C. 154(b) by 0 days.

(21) Appl. No.: 11/132,591

(22) Filed: May 20, 2005

(51) Int. Cl.
*A01B 1/16* (2006.01)

(52) U.S. Cl. .......................... 172/378; D8/6; 56/400.16

(58) Field of Classification Search ............... 172/371, 172/375, 378–380; 56/400.04, 400.05, 400.16; D8/6; 7/114, 116
See application file for complete search history.

(56) References Cited

U.S. PATENT DOCUMENTS

| | | | | |
|---|---|---|---|---|
| 743,981 | A * | 11/1903 | Hagen | 172/375 |
| 849,304 | A * | 4/1907 | Whitted | 56/400.16 |
| 1,172,981 | A * | 2/1916 | Gorman | 172/375 |
| 1,632,883 | A * | 6/1927 | Carkey | 172/375 |
| 2,040,751 | A * | 5/1936 | Marseilles | 172/375 |
| 2,225,108 | A * | 12/1940 | Glascock | 172/173 |
| 2,268,252 | A * | 12/1941 | Helmers | 172/374 |
| 2,513,033 | A * | 6/1950 | Linden | 172/375 |
| 2,597,954 | A * | 5/1952 | Schaller | 172/375 |
| 2,752,839 | A * | 7/1956 | Robertson | 172/375 |
| D241,409 | S * | 9/1976 | Lopizich | D8/6 |
| D251,540 | S * | 4/1979 | Faltin | D8/6 |
| 4,174,003 | A * | 11/1979 | Zepeda | 172/375 |
| 4,432,421 | A * | 2/1984 | Granberg | 172/375 |
| 5,003,760 | A * | 4/1991 | Webb | 56/400.06 |
| 5,311,733 | A * | 5/1994 | Krenkel | 56/400.06 |
| 5,373,903 | A * | 12/1994 | Lewis | 172/375 |
| 5,758,480 | A * | 6/1998 | Creasy | 56/400.04 |
| D505,601 | S * | 5/2005 | Hall | D8/6 |

* cited by examiner

*Primary Examiner*—Thomas B. Will
*Assistant Examiner*—Alexandra Pechhold

(57) ABSTRACT

A handle is attached to a multipurpose gardening implement that has six narrow, parallel (in full length) tines, separated by no less than 6 mm nor more than 7 mm, on one side of the implement head and two narrow, parallel (in full length) tines, separated by no less than 2 mm nor more than 3 mm, on the opposite side. The implement heads are each attached at 90-degree angles to the handle and 180-degrees relative to each other. When used to extract weeds, the side with multiple tines is employed for those with fibrous root systems while the opposite side is used to aid in the extraction of weeds with singular 'taproot' root structure. Rotation of the handle 180 degrees allows alternate use of either side depending on the type of weed to extract.

1 Claim, 3 Drawing Sheets

MULTIPURPOSE, HAND HELD, WEED EXTRACTING, GARDEN TOOL

REFERENCES CITED TO RELATED APPLICATIONS

U.S. Patent Documents

| | | | |
|---|---|---|---|
| 3865348 | February 1975 | Close | 254/132 |
| 4243206 | January 1981 | Heikkinen et al. | 294/55 |
| 5004053 | April 1991 | Martell | 172/375 |
| 5003760 | April 1991 | Webb | 56/400.06 |
| 5033782 | July 1991 | Hirzel | 294/55 |
| 5383523 | January 1995 | Stamp | 173/378 |
| 6019013 | August 2000 | Scott | 56/400.05 |

STATEMENT OF FEDERALLY SPONSORED RESEARCH OR DEVELOPMENT

There is no Federal sponsorship of research or development regarding this invention.

NAMES OF JOINT RESEARCH PARTIES

There is no joint research regarding this invention.

REFERENCE TO "SEQUENCE LISTING"

No sequence listing regarding this invention.

FIELD OF THE INVENTION

This invention relates generally to a manually operated hand held garden tool.

BACKGROUND OF INVENTION

Gardening is one of the more pleasurable activities of all age groups in the United States as well as the rest of the world. It has long been recognized that weeding those gardens can be one of the least pleasurable aspects of this hobby. Frustrations abound in the endeavor to remove weeds from the soil around the more desirable plants. Pulling weeds is difficult and strenuous and often not effective as either the tops pull off and the remaining roots regenerate the weed in a short time (dandelions, wild radish) or it is virtually impossible to extract the many diffuse roots of grasses effectively and then the remaining roots once again re-grow. Most implements for weed control are cutting tools (e.g. hoes, mowers, weed whippers, cultivators etc.) that again scrape or cut away the top of the weed only to leave the roots to re-grow. It is well known that if 'You don't get the root—you don't get the weed'. Various cultivators uproot the weeds, but unless the weeds are removed, they also re-root and regenerate and a lot of the soil is disturbed in the process. Many of these implements are larger and heavy, require substantial force to manipulate and are difficult to maneuver around smaller confined beds of plants without damage to "non weeds". The need to manually remove up-rooted weeds requires further bending and stooping repetition.

A second problem concerns the physical agility of the person doing the weeding. As we avid gardeners get older the constant up and down movement as you move from patch to patch is tiring and painful if your back (like mine) tends to get strained. Implements that up-root the weeds but do not provide a means to 'grab' or impale them necessitate even more bending and stooping to pick up and dispose of the weeds.

What is needed is a lightweight implement that can be used in either standing or kneeling or sitting position. It should be small, effective and precise in removing weeds with minimal effort. It should be effective in extracting either taproot or fibrous root type weeds with minimum disturbance of the surrounding plantings. It should be sharpened to be capable of impaling the up-rooted weed for disposal to minimize repeated bending over to pick up the debris.

This invention satisfies these needs.

SUMMARY OF THE INVENTION

In accordance with the present invention there is provided a hand held multiple use weeding tool which comprises a handle of suitable length to allow precision weeding to be done while either standing or kneeling, connected to a small, lightweight head with the Lower side comprised of six, closely spaced, parallel (in full length), narrow, elongated tines, for extracting fibrous root systems, and the Upper side of the head comprised of two closely spaced, parallel along the entire length of the head, narrow, elongated tines for extracting taproot type weeds. Both configurations facilitate effective impaling of the uprooted weeds for easy disposal.

DESCRIPTION OF THE PREFERRED EMBODIMENT

Figure 1:
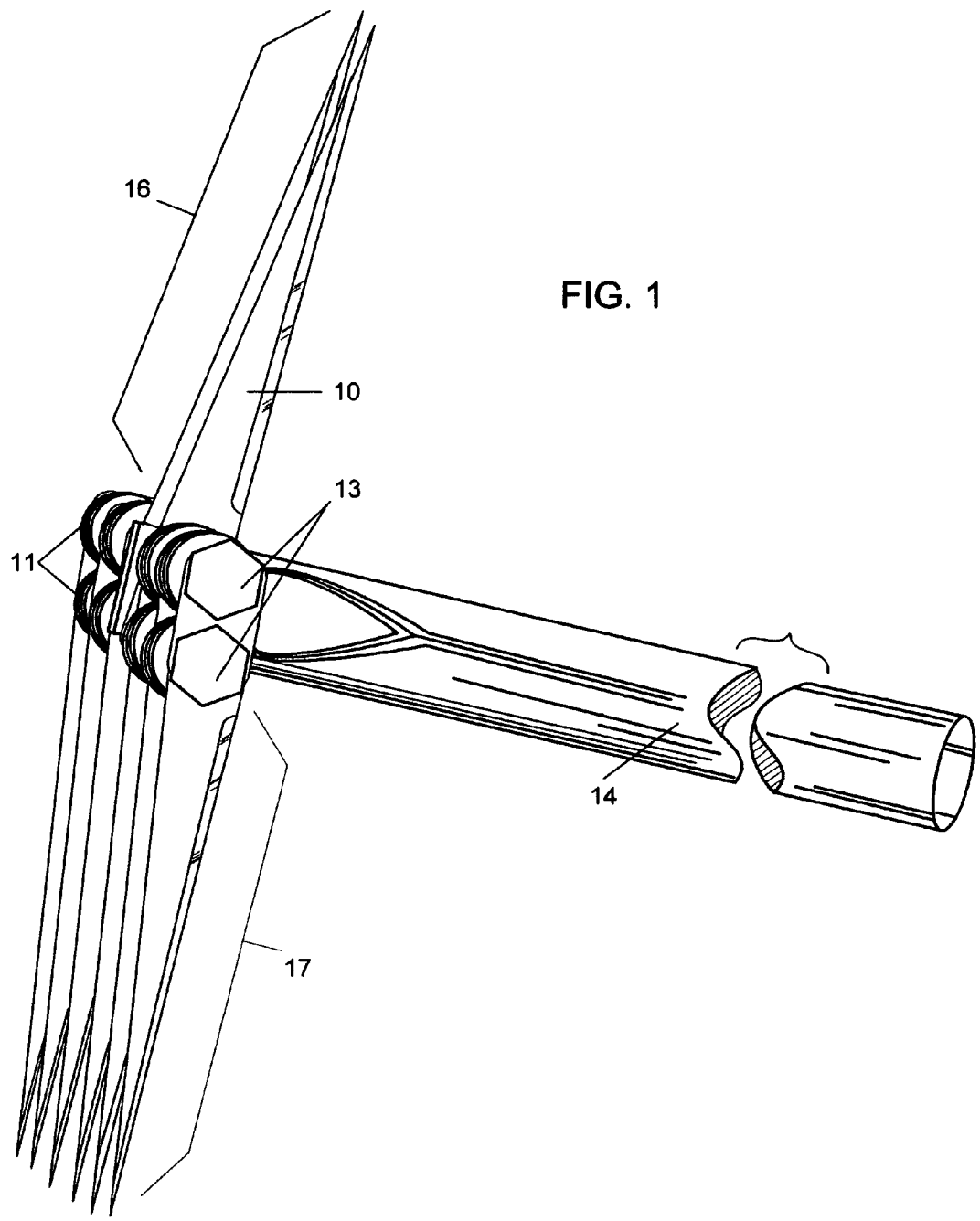
FIG. 1 is a perspective view of the head of the invention

FIG. 1 is an overall view of the present invention. The working head of the invention is comprised of two opposing structures. The Upper Head 16 is comprised of two parallel Tines 10 that join the handle at a 90-degree angle and is used to dislodge and impale taproot type weeds. The Lower Head 17 is comprised of six parallel Tines 10 that join the handle at a 90-degree angle and is used to dislodge and impale fibrous rooted weeds. Handle 14, is fabricated of tubular stainless steel for strength, durability, longevity of tool life and simplicity of attaching the head. Stainless steel is preferred due to its high strength and durability and lack of rusting. One end of the Handle 14 tube is flattened and perforated with two holes ¼" (6.35 mm) in diameter for attaching the head. The holes are arranged ⅜"(9.5 mm) from the end of the shaft, perpendicular to its long axis, and spaced ¾"(19 mm) apart, center to center. Tines 10 have two similar ¼" (6.35 mm) holes punched in their broad end also ¾" (19 mm) apart. The two holes in both the Handle 14 and Tines 10 are spaced the same so that all holes line up and allow the threading through of the two, ¼"×2" Hexagonal Bolts 13. These bolts link all the components of the head and handle together in the correct configuration. (FIG. 2)

The preferred length of handle 14 is 12–15" when the tool is used for close work among plants or while kneeling, women often preferring the smaller size. The preferred length of the handle 14 is 18–26" when the tool is used while the gardener is in a standing position. Taller persons prefer the longer handle since less stooping is required while weeding.

Figure 2:
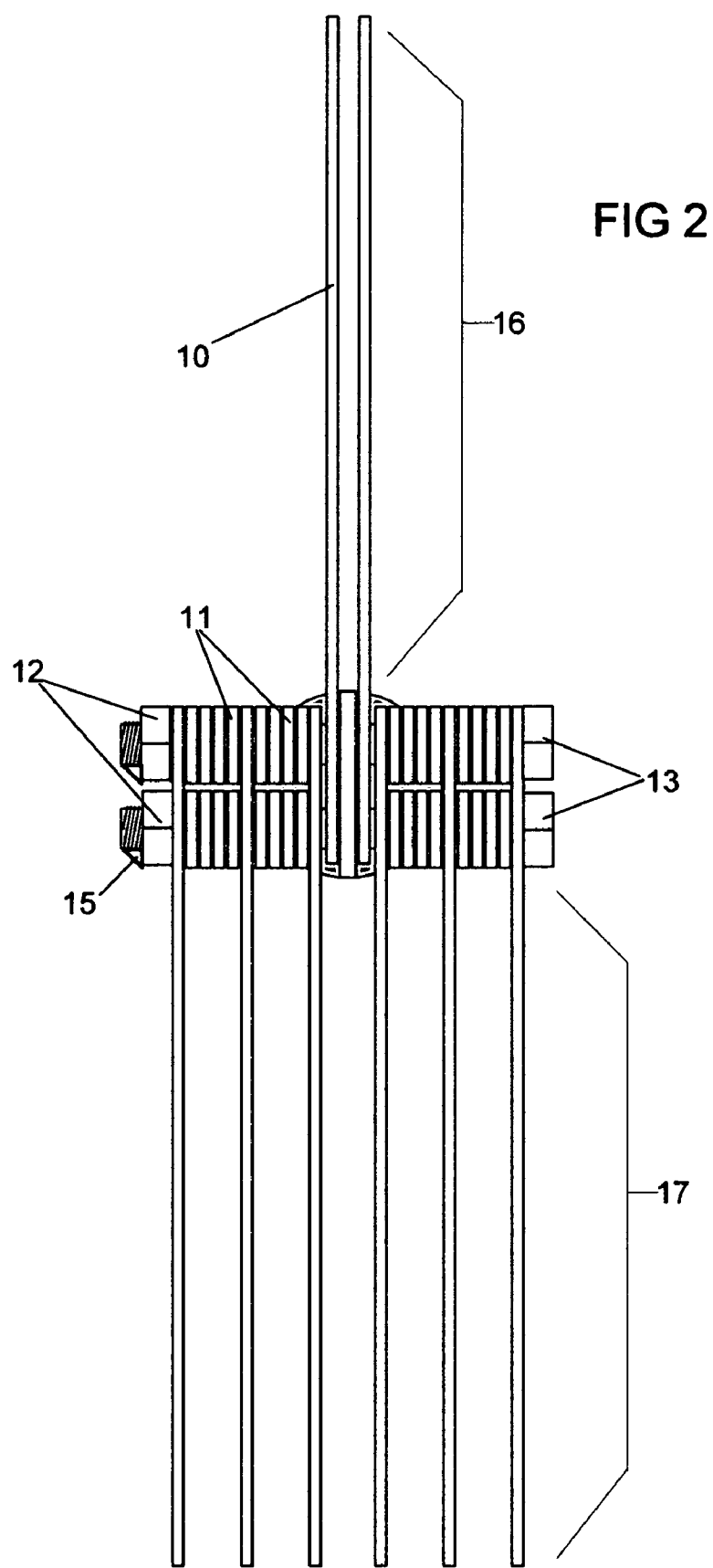
FIG. 2 is an end view of the head of the present invention

FIG. 2 is an end view of the head of the implement that more clearly shows the correct configuration of the Tines 10, Spacers 11 and Handle 14 and demonstrates the results of employing the important ratio between tine thickness, spacing and length of 1:3.5:66. The Spacers 11, in the current invention, are comprised of four standard ¼" flat washers and, in the Comb Lower Head 17 section of the head, create a space between Tines 10 of ¼"(6.35 mm). Spacers other than flat washers could be employed so long as their usage results in a space between Tines 10 of ¼" (6.35 mm) and their composition is suitably dense to create a rigid head when the Hex Nuts 12 are tightened at assembly. The flattened end of Handle 14 serves as the spacer between the two Tines 10 of the Upper Head 16 section of the head located 180-degrees opposite the Comb Lower Head 17 section. The fully assembled head is less than two inches (5 cm) in total width in the Lower Head 17 section while the Upper Head 16 is approximately ¼" (6.35 mm) wide. The completed assemblage is finally secured with two, ¼" Hex Nuts 12 that are sufficiently tightened to create a rigid joining of the head and Handle 14. The Hex Nuts 12 are further immobilized by small Weld Seams 15, that permanently fix the Hex Nuts 12 to the Hexagonal Bolts 13.

Figure 3:
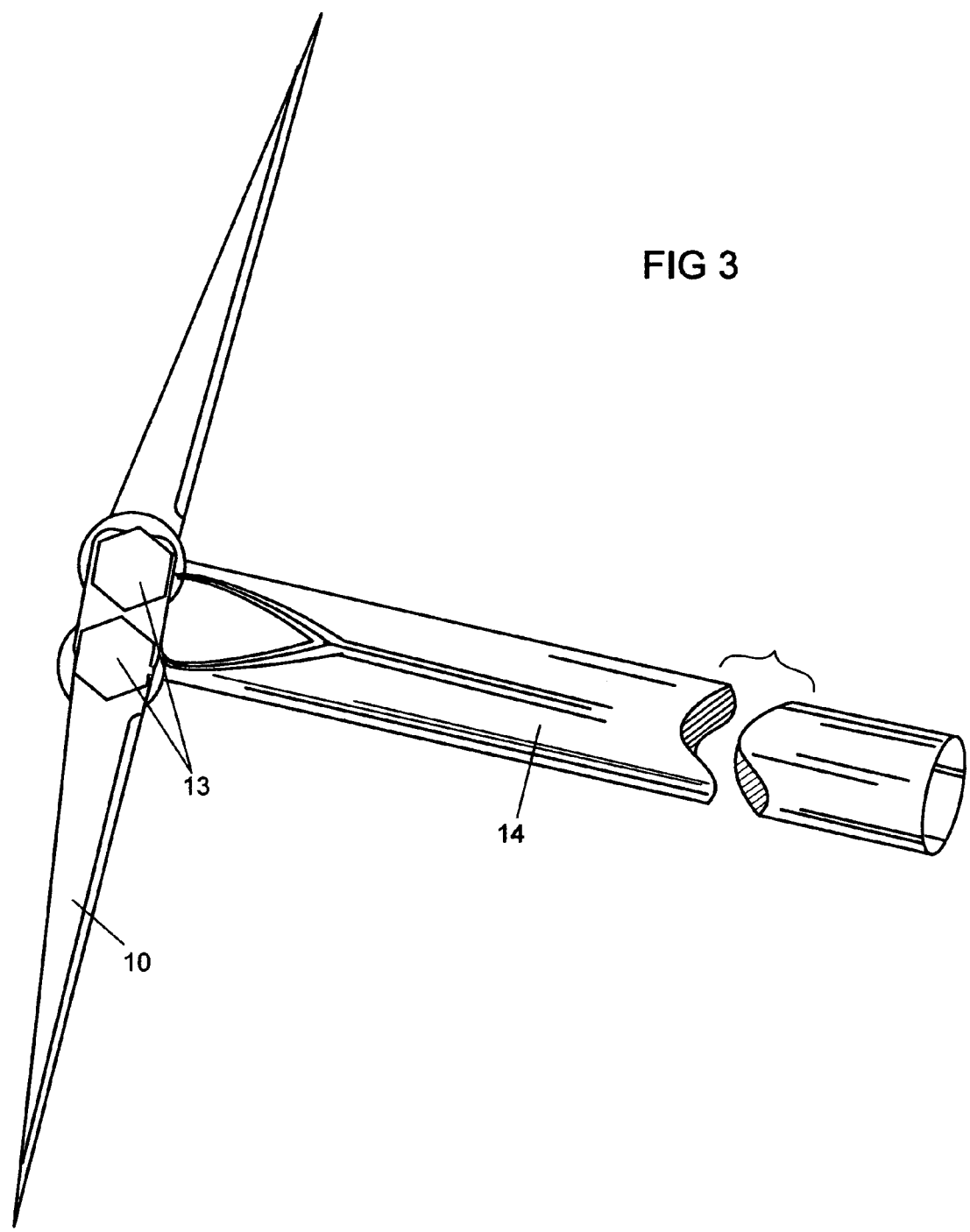
FIG. 3 is a side view of the present invention

FIG. 3 is a side view of the invention and shows greater detail of the Tines 10 and the 90-degree orientation of each head to the handle. The Tines 10 are fabricated from stainless steel flat stock approximately 70/1000" (1.8 mm) in thickness. Tines 10 are 4½" (12 cm) long, resulting in a thickness to length ratio of approximately 1:66, and ½" (12.7 mm) wide at the broad end proximal to the Handle 14 and then taper to a sharp point at the distal end. Two ¼" (6.35 mm) holes are punched centrally in the broad end, parallel to the long axis of the Tine 10 and spaced ¾" (19 mm) apart, center to center, to allow the passage of the Hexagonal Bolts 13. The Tine 10 edges facing the shaft of Handle 14 are sharpened on one face to facilitate low force passage of the tool through the soil.

The invention is best used for extracting weeds using a 'chopping' motion with the Lower Head 17 side to undermine and loosen the roots from the soil. The weed can then be impaled on the closely space tines for disposal. This narrow construction and sharp, narrow Tines 10 allow more precise manipulation in areas where weeds are in close proximity to the desired plants and/or actually situated in the roots of the desired plants. Removal of such embedded weeds is very difficult with conventional hoes, cultivators and other devices that have large and blunt tines. (Lopizich D241,409) The closely spaced tines are better suited for extracting roots of a fibrous nature such as grass than the widely spaced tines of most cultivators that allow the roots to 'slip through' when cultivating. The precise narrow spacing also allows extraction of very small weeds that larger implements pass over. Extracting the roots intact is preferred over cutting the tops of the weeds and leaving the weed root to regenerate, which is the case with a hoe.

The sharp points and sharpened edges allow easy penetration of the earth around the weed and provide little resistance for the movement of the head through the soil. Another advantage of the Lower Head 17 configuration involves weeds with fibrous root systems like clumps of grass. Ordinarily, a large 'divot' of soil attached to the weed roots is removed when such a clump of grass is pulled out. This problem is substantially reduced using the present invention as a few extra 'chopping' motions delivered to the clump loosens much of that extra soil and allows it to remain in place while the grass clump with bare roots is removed.

The narrow Upper. Head 16 on the opposite side of the head is very useful for loosening and extracting weed roots that are deep and narrow. Repeated chopping with the Upper Head 16 at the base loosens the root in the ground so that the handle can be rotated and the weed impaled with the Lower Head 17 side. If one carries a plastic pail the impaled weeds can be transferred directly and rapidly to the pail for disposal by striking the handle 14 sharply on the edge of the pail and propelling the weed thusly into the pail. This eliminates the added step of bending over and picking the weed up for disposal. The Upper Head 16 is also very effective for minimizing damage to desired plants when used to isolate and 'tease' out weed roots closely entangled with those of the desirable plant, a versatility missing in the Lopizich and Lewis devices. The space between the two Tines10 of the Upper Head 16 allows weed roots to be wedged between the tines for easy extraction.

In the event that one must kneel to work, the long reach of the handle 14 and the ability to loosen, impale and retrieve the weed with one hand easily allows one to clear a larger area before being forced to get up and move to a new location. Fewer such 'relocations' reduce damage to plants in confined beds caused by stepping too frequently into the bed and onto the plants and also avoids compacting of the soil excessively. Difficulty getting up and down is a common complaint of older gardeners so reducing the number of times this must be done is a definite benefit. Although not specified, the invention also does an efficient job of cultivating and loosening the soil in the garden.

What is claimed is:
1. A multipurpose garden implement comprising:
   a head with an upper and lower side, the lower constructed using tine thickness, spacing and length ratios of 1:3.5:66, both joined to the distal end of the handle at a 90-degree angle, and opposing each other at a 180-degree angle with;
   the lower side comprised of six, 1.8 mm thick by 12 cm long, tapering, stainless steel, parallel, tines, sharpened on one side and narrowly separated from each other by no more than 7 mm and no less than 6 mm along the entire length of the tine such that the ratio of tine thickness to tine separation is no less than 1:3 and no greater than 1:4 and the ratio of tine thickness to tine length falls in the range of 1:60 to 1:70 and;
   the upper side composed of two, 1.8 mm thick by 12 cm long, tapering, stainless steel, parallel tines, sharpened on one side, and narrowly separated by no less than 2 mm nor more than 3 mm along the entire length of the tine and;
   a stainless steel handle, which may vary in length from 12" to 24" depending on whether weeding is done standing, sitting or kneeling, rigidly attached to the head.

* * * * *